(12) United States Patent
Ostachowski

(10) Patent No.: US 10,345,090 B2
(45) Date of Patent: Jul. 9, 2019

(54) ANGLE FINDER PROTRACTOR

(71) Applicant: Edward Ostachowski, Oakville (CA)

(72) Inventor: Edward Ostachowski, Oakville (CA)

(*) Notice: Subject to any disclaimer, the term of this patent is extended or adjusted under 35 U.S.C. 154(b) by 165 days.

(21) Appl. No.: 15/361,483

(22) Filed: Nov. 27, 2016

(65) Prior Publication Data

US 2017/0153101 A1 Jun. 1, 2017

Related U.S. Application Data

(60) Provisional application No. 62/261,851, filed on Dec. 1, 2015.

(51) Int. Cl.
*B43L 7/10* (2006.01)
*G01B 3/56* (2006.01)

(52) U.S. Cl.
CPC ............... *G01B 3/563* (2013.01); *B43L 7/10* (2013.01)

(58) Field of Classification Search
CPC .............. B43L 7/10; G01B 3/56; G01B 3/563
USPC .......................................................... 33/471
See application file for complete search history.

(56) References Cited

U.S. PATENT DOCUMENTS

| | | | | | |
|---|---|---|---|---|---|
| 1,368,857 A | * | 2/1921 | Stevens | ................. | G01C 15/12 33/1 LE |
| 1,549,271 A | * | 8/1925 | Larson | ..................... | B43L 7/02 33/469 |
| 1,550,755 A | | 8/1925 | Steinle | | |
| 1,576,800 A | * | 3/1926 | Tibony | ..................... | B43L 7/12 33/27.03 |
| 1,585,563 A | | 5/1926 | Schlattau | | |
| 1,655,887 A | | 1/1928 | Bailey | | |
| 2,173,526 A | * | 9/1939 | Adams | ...................... | B43L 9/00 33/495 |
| 2,480,914 A | * | 9/1949 | Gallington | ............ | G01B 3/563 33/471 |
| 2,735,185 A | | 2/1956 | Naphtal | | |
| 4,144,650 A | | 3/1979 | Rawlings | | |
| 4,394,801 A | | 7/1983 | Thibodeaux | | |
| 4,422,245 A | * | 12/1983 | Schiller | ..................... | B43L 7/02 33/403 |
| 4,562,649 A | | 1/1986 | Ciavarella | | |
| 4,733,477 A | | 3/1988 | Fincham | | |
| 4,745,689 A | | 5/1988 | Hiltz | | |
| 4,911,214 A | * | 3/1990 | Scott | ..................... | B23Q 9/005 144/136.95 |
| 5,172,484 A | * | 12/1992 | Triola | ...................... | B24B 3/36 33/1 N |
| 5,189,804 A | * | 3/1993 | Ostachowski | ........... | G01B 3/56 33/1 N |
| 6,553,676 B1 | * | 4/2003 | Carlson | ..................... | B43L 7/10 33/424 |
| D502,115 S | * | 2/2005 | Chudek | ........................ | D10/65 |
| 2004/0035011 A1 | * | 2/2004 | Carlson | .................... | G01B 3/04 33/424 |
| 2011/0061252 A1 | * | 3/2011 | Cerwin | ................... | B25H 7/02 33/414 |
| 2012/0096725 A1 | * | 4/2012 | Pinal | ...................... | B43L 7/005 33/471 |
| 2017/0153101 A1 | * | 6/2017 | Ostachowski | ........... | B43L 7/10 |

* cited by examiner

*Primary Examiner* — Yaritza Guadalupe-McCall
(74) *Attorney, Agent, or Firm* — Jeffrey S. Melcher; Melcher Patent Law PLLC

(57) ABSTRACT

An angle indicating instrument which, used in conjunction with a sliding T-Bevel, can indicate to users what miter saw setting to use when cutting two pieces of material for a miter joint, or for cutting one piece of material requiring a miter cut.

8 Claims, 16 Drawing Sheets

Acute Angle

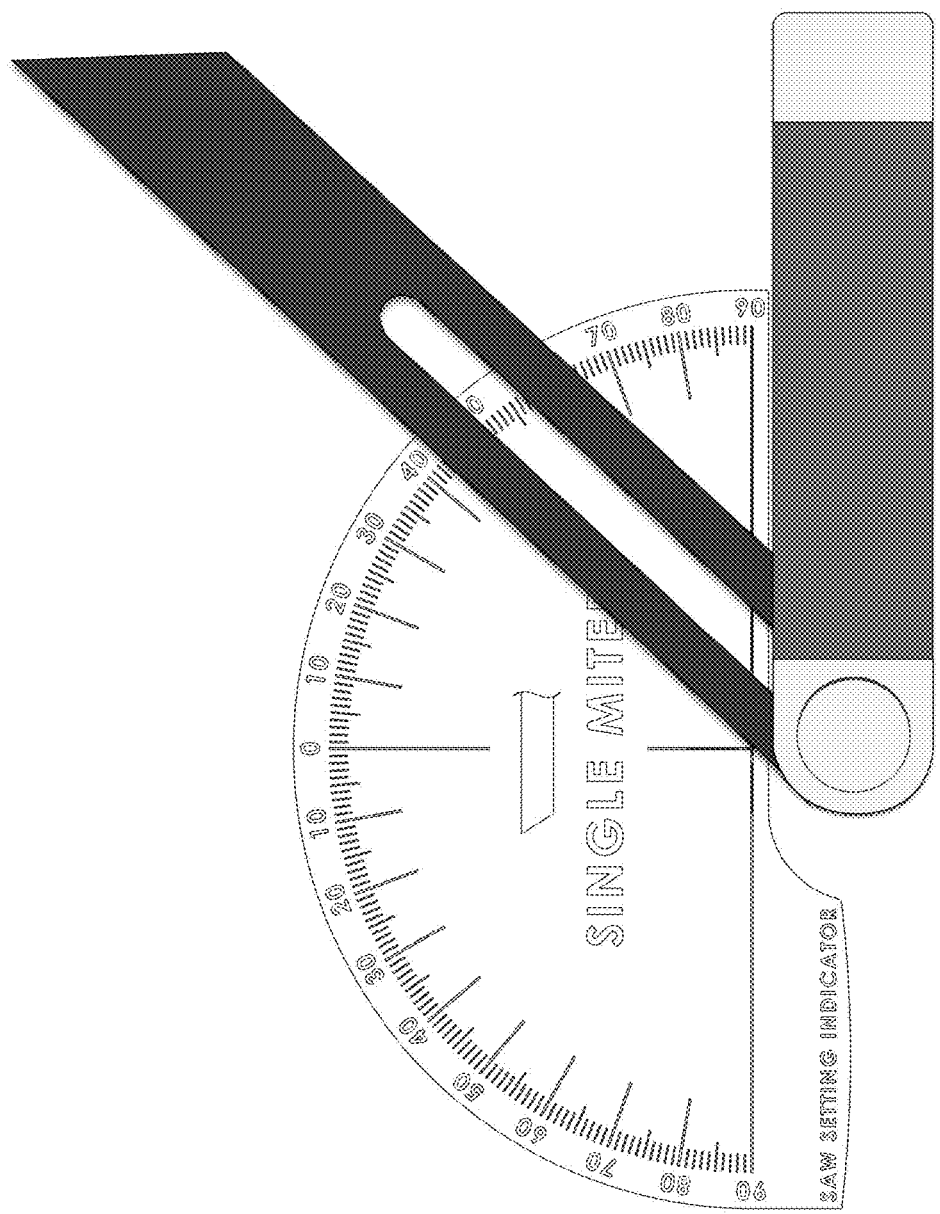

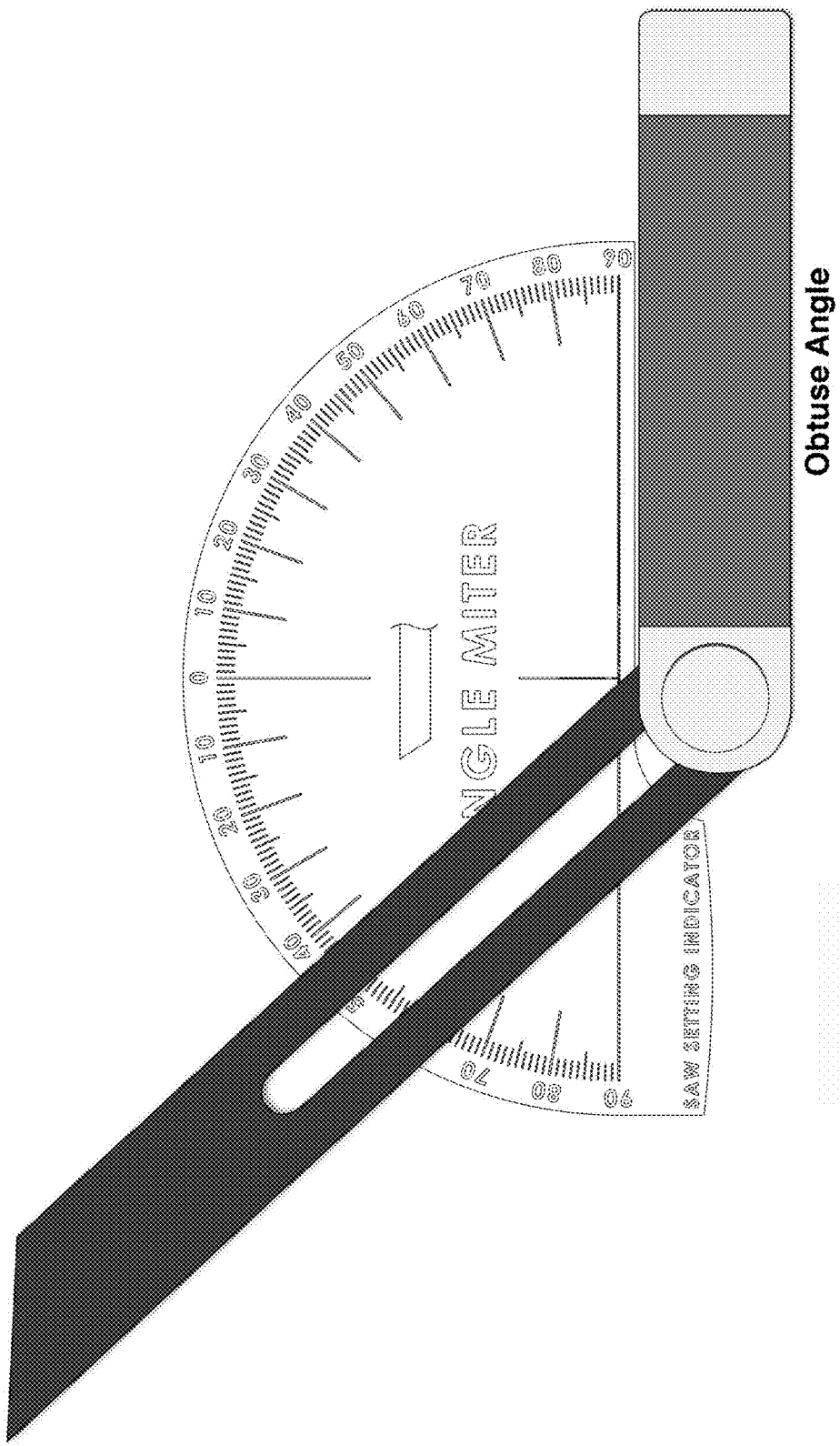

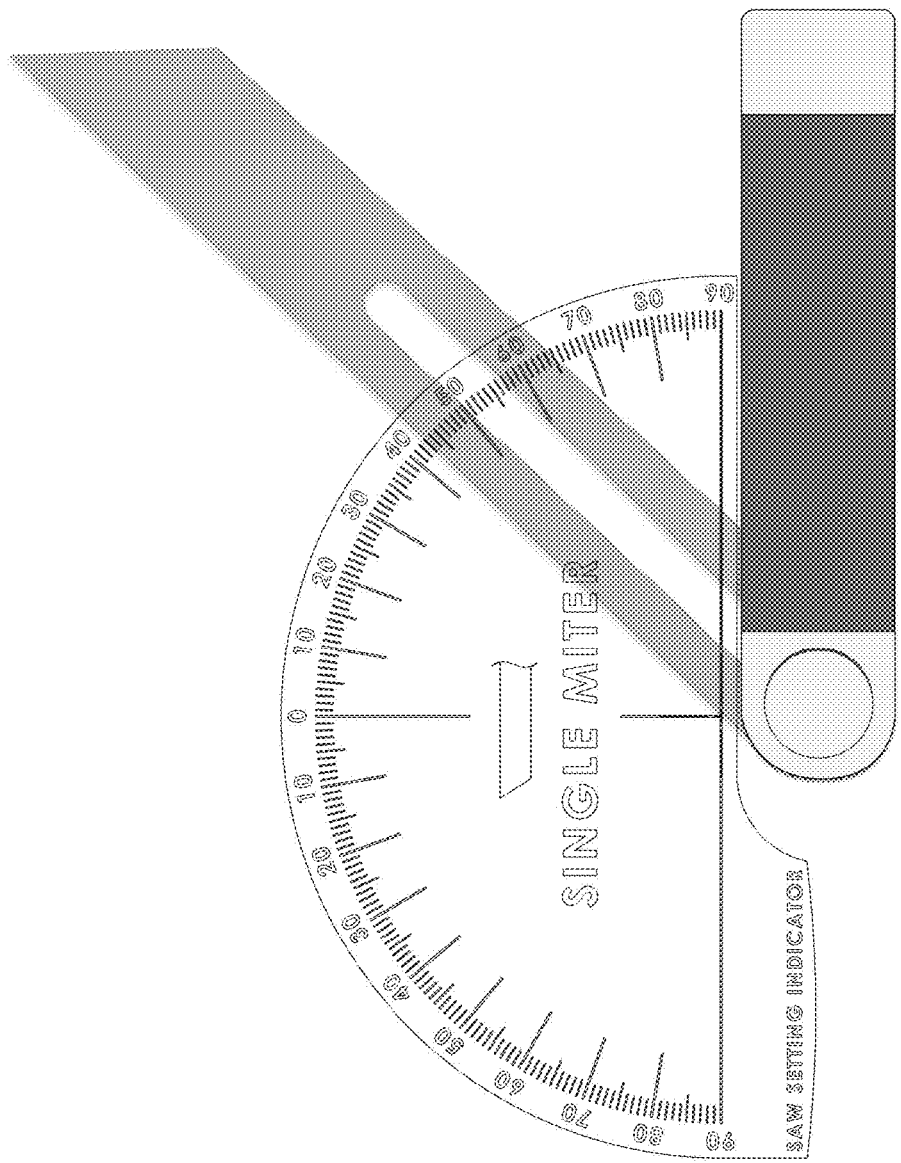

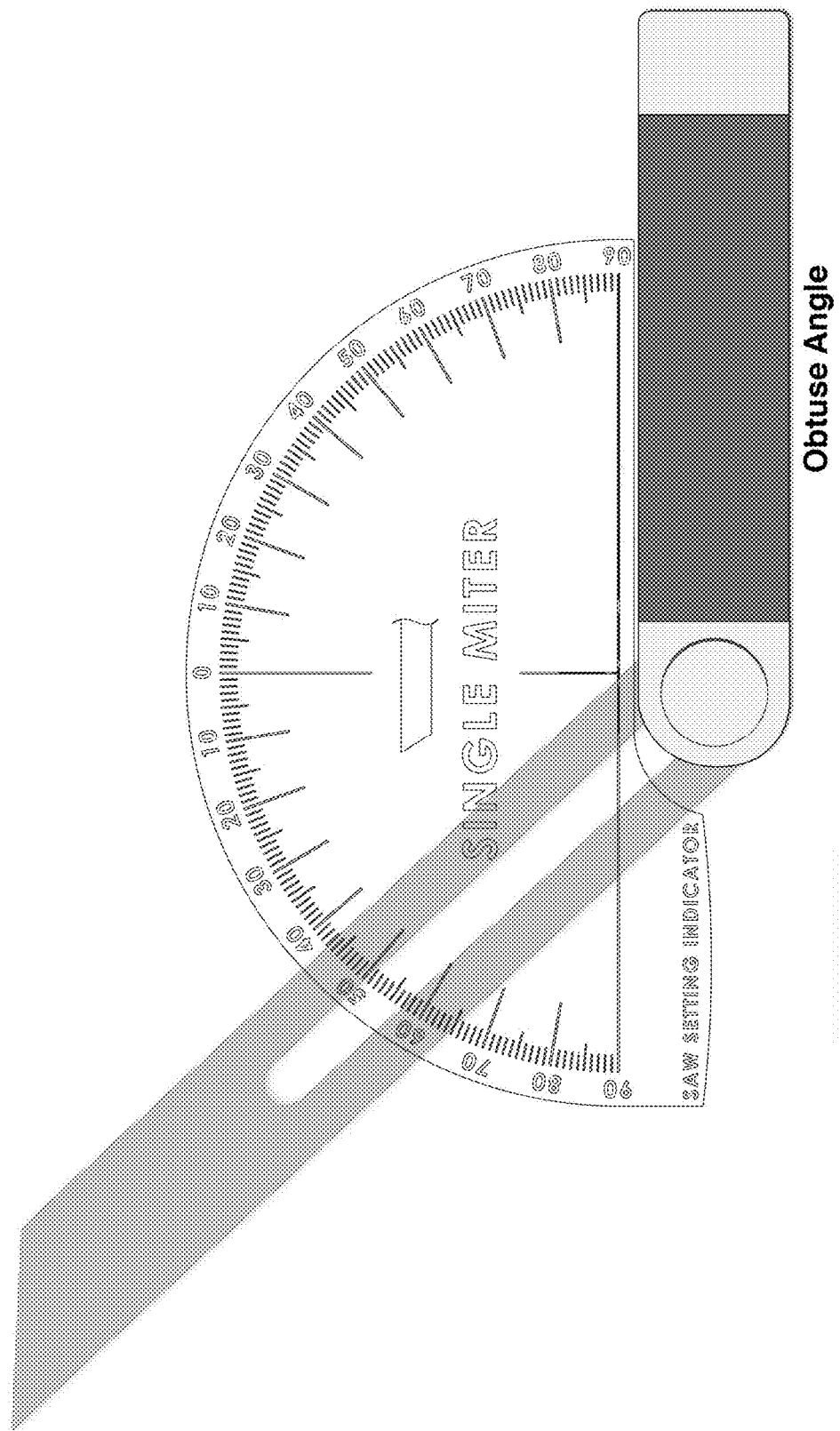
Figure 5. b

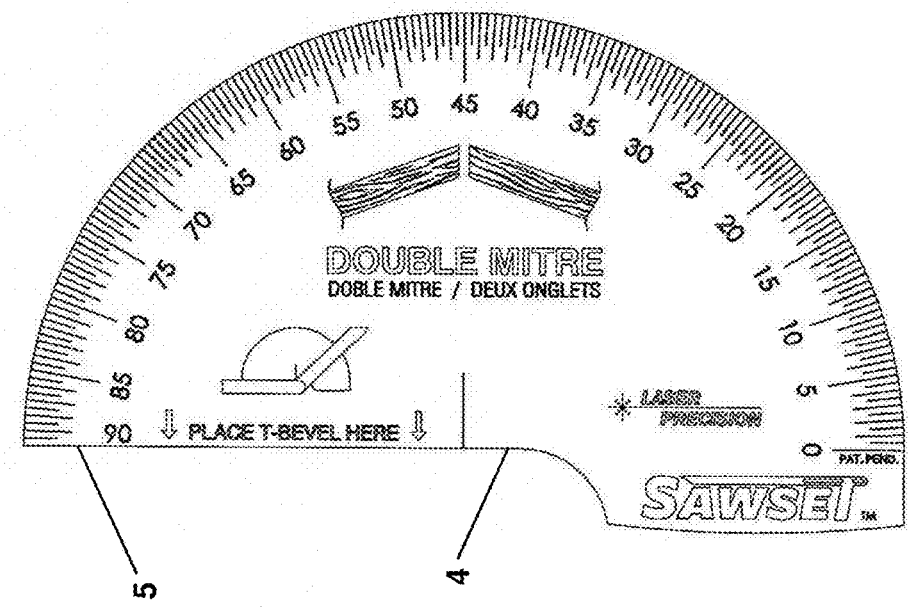
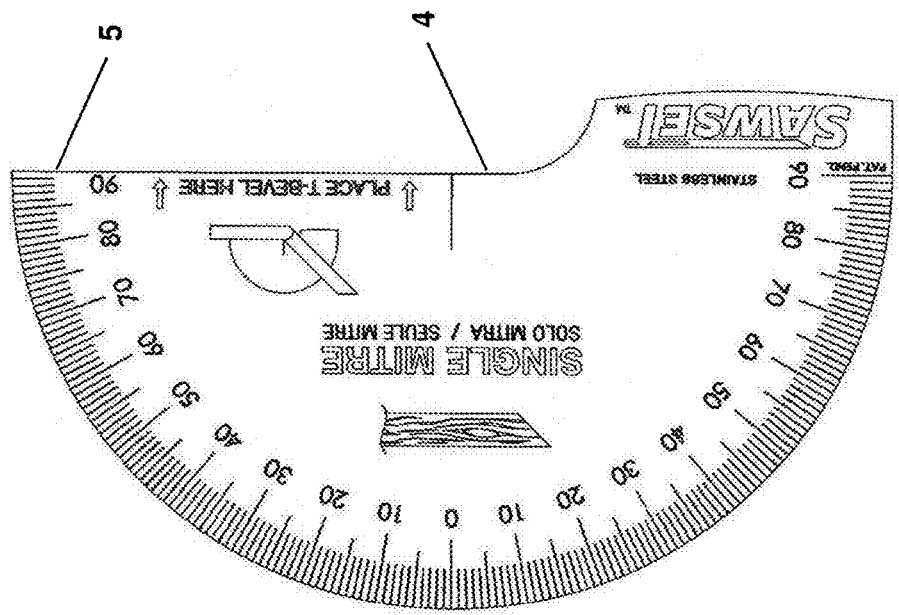
FIGURE 10

ANGLE FINDER PROTRACTOR

CROSS REFERENCE TO RELATED APPLICATION

This application claims the benefit of U.S. Provisional Application Ser. No. 62/261,851, filed Dec. 1, 2015, entitled "Angle Finder Protractor", which is incorporated by reference herein in its entirety.

BACKGROUND

Field of the Invention

The present invention is directed to an instrument and method for determining and displaying the appropriate angle setting for a power miter saw for cutting miter ends and miter joints.

Most power miter saws sold today are fitted with miter saw gauges which display the angle of the miter cut. However, the markings and graduations on such miter saw gauges are often counterintuitive and very confusing for less experienced users and even for professional users. Finish carpenters, in particular, when installing crown molding or trim in a room, must make numerous double mitered joints where the walls meet at an angle. The miter angle is half of the angle of the required turn. For example, if molding must make a right angle, i.e., a 90° turn, each of the adjacent pieces is cut to a 45° angle where they are to be joined.

In practice, walls often meet at angles which are not perfectly 90°. For these situations, a popular current method for calculating the miter saw setting for the double miter cut involves the following steps:
a) Transferring ("picking up") the actual angle between the two adjoining walls to a Sliding T-Bevel;
b) Laying the Sliding T-Bevel on top of a protractor, so as to measure the actual angle;
c) Subtracting the measured angle from 180°, then dividing the subtraction result by 2, to obtain the setting needed for the miter saw angle gauge.

For single miter cuts (such as the angled end cut required for the stair spindles), the calculation would be:
a) From the acute position of the spindle: miter saw setting=90° minus the measured angle;
b) From the obtuse position of the spindle: miter saw setting=the measured angle minus 90°.

The counterintuitive calculations described above are necessary because the value of the measured angle is different from the miter angle setting to be used on a miter saw. These calculations are challenging to even experienced craftsmen, often pushing users to resort to a process of trial and error in order to obtain the proper angle setting needed for the miter saw. Specialized digital angle measuring and calculating devices (to facilitate setting the proper miter saw angle for such miter cuts) are commercially available, however they are quite expensive.

There is an unmet need in the market for a simple and inexpensive device that could translate the actual angle between two adjoining walls (as picked up by a Sliding T-Bevel) directly into the proper angle setting for a power miter saw, without the need for calculations. It would also be very desirable for such a device to be useable for single miter cuts as well as for double miter joint cuts.

Related Art

U.S. Pat. No. 4,394,801 to Thibodeaux discloses a construction tool that is used to measure the relative angle between two lines or surfaces or between horizontal or vertical and such a line or surface. It also indicates roof pitch on a separate scale. Bubble type levels are included to orient the construction tool with respect to horizontal or vertical.

U.S. Pat. No. 4,562,649 to Ciavarella discloses an adjustable carpenter's square for use determining the relative angle between two lines or surfaces. The absolute angle between the two lines is indicated, and is viewed through opening 31.

U.S. Pat. No. 4,745,689 to Hiltz discloses a measuring and layout tool that has a plurality of levels therein and indicates the relative angle between two lines or surfaces.

U.S. Pat. No. 4,144,650 to Rawlings et al. discloses a multifunction level that again shows the relative angle between two lines or surfaces. This level can be locked at a particular angle, if desired, with the locking mechanism accessible from either side of the level, thus making it easier to use.

U.S. Pat. No. 2,735,185 to Naphtal discloses a protractor that is used to measure angles between two lines or surfaces. The angle of the protractor is lockable thereby also allowing it to be usable to recreate the angle in order to draw it accurately on paper or wherever. The angle is viewed through a magnifying bubble located above the scale.

U.S. Pat. No. 1,655,887 to Bailey discloses a protractor that may be used to very accurately measure angles between two lines or surfaces or to very accurately measure very small angles, and works in the following manner. As the blades 5 and 6 are moved angularly with respect to one another, gear teeth 9, which are part of ring 7 that is in turn attached to blade 5, cause the free turning gear 11 to rotate. Gear 11 is part of the plate 10 that is attached to blade 6. Gear 11 meshes with gear 12 and causes it to turn. Rigidly attached to gear 12 is plate 13. Plate 13 is caused to be angularly displaced at a much greater rate then the two blades 5 and 6 are separated at. This is because the ratio of the gear teeth on gears 9, 11 and 12 cause gear 12 to move at an angular speed that is greater than gear 9.

U.S. Pat. No. 1,585,563 to Schlattau discloses a combination measuring instrument that measures the relative angle between two lines or surfaces, and provides a linear measuring scale, a means for measuring the outside diameter of an object, and also a scale that is used to measure the diameter of a bolt or a piece of wire. The scale for measuring a bolt or a piece of wire is an enlarged scale.

U.S. Pat. No. 1,550,755 to Steinle discloses an angulometer that is used to measure the relative angle between two lines or surfaces, including a magnifying lens to allow a very fine angular scale to be read easily.

U.S. Pat. No. 4,733,477 to Fincham et al. discloses a chalk line framing square that provides a device that is designed to aid in placing right angle intersecting chalk lines upon a floor so that tiles can be properly installed on the floor. It includes two arms that pivot with respect to one another and an angular scale that indicates the angle between the two arms.

SUMMARY OF THE INVENTION

The present invention responds to this unmet need in the market by introducing a simple and inexpensive protractor device, adapted to work with any standard Sliding T-Bevel so as to directly provide to users the proper miter saw setting for double miter joint cuts and for single miter cuts.

The protractor device of this invention is designed to work with standard size Sliding T-Bevels to enable the users to read directly the proper miter saw setting needed for the particular desired miter cut. One face of the protractor has specific markings indicating the setting for double miter joint cuts, while the reverse face of the protractor has specific markings indicating the setting for single miter cuts. A functional shape feature on the bottom part of the protractor ensures that the Sliding T-Bevel is always placed in the correct orientation on the protractor's face.

The invention provided herein gives a person working with wall trim (such as chair rail, cove molding, crown molding, base board and other joinery) as well as with non-decorative trim installations such as hand rail, spindles, flooring, aerospace applications and other situations where angles have to be taken from a surface or an edge and measured for a subsequent operation, a scale that reads directly the miter angle setting for use on a miter saw having an angle scale incorporated thereon.

According to a preferred embodiment of this invention, a protractor is provided that has a half-circle disk with angle scale measurements scribed thereon. The protractor also has a tab jutting out from the bottom edge, which tab serves to ensure that a Sliding T-Bevel is always placed properly on the face of the protractor so as to read the proper setting needed for the miter saw. To further guide the user in proper placement of the Sliding T-Bevel relative to the protractor, instructional wording or pictograms may be provided on the face or at certain points along the bottom edge of the protractor, to indicate the proper place where the Sliding T-Bevel should engage the protractor (for example, inscriptions such as "place the Sliding T-Bevel here" or a tiny picture showing a Sliding T-Bevel correctly positioned on the protractor).

Alternative embodiments of this invention may have the two quarter-circle portions (of the overall half-circle disk) transposed slightly apart, to allow a raised member to be positioned in the central vertical surface gap thus created, on one or both faces of the protractor. The role of such raised member(s) is to further guide the proper positioning of the T-Bevel relative to the protractor, ensuring an accurate angle reading.

According to a preferred embodiment of this invention the protractor has two faces, which can be accessed simply by flipping over the protractor. One face of the protractor has the miter saw angle settings for single miter cuts, while the other face of the protractor has the miter saw angle settings for the cut needed for double miter joints. In alternative embodiments of this invention, single-faced protractors (with one scale for either single miter cuts or for double miter joint cuts) can be sold individually, or in sets of two, or combined on one face.

BRIEF DESCRIPTION OF THE DRAWINGS

The novel features which are believed to be characteristic of the present invention, as to its structure, functionality, use and method of operation, together with further objectives and advantages thereof, will be better understood from the following drawings in which a presently preferred embodiment of the invention will now be illustrated by way of example. It is expressly understood, however, that the following drawings are for the purpose of illustration and description only, and are not intended as a definition of the limits of the invention. In the accompanying drawings:

FIG. 4a is a front view of a protractor according to this invention, depicted in functional engagement with a Sliding T-Bevel which has picked up an "acute angle", whereby the user can directly read the required miter saw setting for the single miter cut (in the specific example in FIG. 4a, this setting is 43°);

FIG. 4b is a front view of a protractor according to this invention, depicted in functional engagement with a Sliding T-Bevel which has picked up an "obtuse angle", whereby the user can directly read the required miter saw setting for the single miter cut (in the specific example in FIG. 4b, this setting is also 43°).

FIG. 5a is a front view of a protractor according to this invention; it is the same as FIG. 4a above, but with the blade of the Sliding T-Bevel depicted semi-transparently, so as to better show the portions of the protractor underneath the Sliding T-Bevel;

FIG. 5b is a front view of a protractor according to this invention; it is the same as FIG. 4b above, but with the blade of the Sliding T-Bevel depicted semi-transparently, so as to better show the portions of the protractor underneath the Sliding T-Bevel.

FIG. 10 shows front views of both faces of a protractor according to a further alternative embodiment of this invention, whereby the bottom edge of the protractor is flush and level with the horizontal line running from the leftmost to the rightmost angle mark on the protractor dial.

DESCRIPTION OF THE INVENTION

To clarify the terms used herein:

a) A single miter cut is just one angled cut to one workpiece. A single miter cut is made for one workpiece to fit to an angle. A cross-cut is an example of a single miter cut.

b) A double miter joint is formed when two parts must join to form a corner; to achieve this, each of the two pieces must be miter cut to an equal miter angle.

Figure 1:
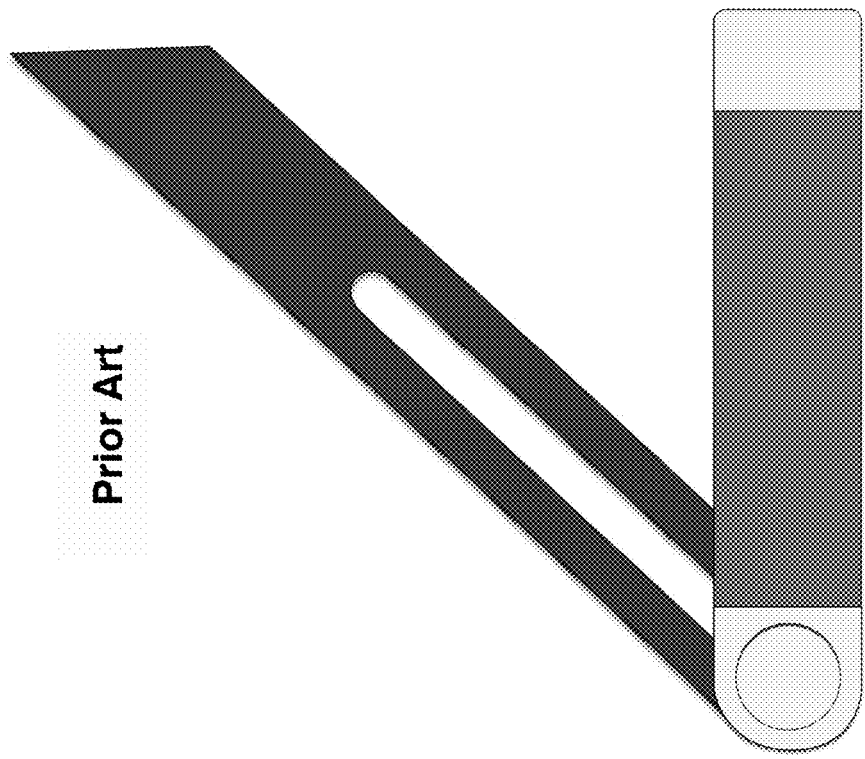
FIG. 1 is a picture of a standard PRIOR ART Sliding T-Bevel of the type that is to be used with the present invention.

Referring now to the invention in more detail, FIG. 1 illustrates a typical PRIOR ART Sliding T-Bevel of the type that is to be used with the present invention. A Sliding T-Bevel of this type consists typically of a pivoting/sliding blade, a handle and a thumbnut which can be tightened to lock the blade relative to the handle. A Sliding T-Bevel, as known in the prior art, is often used for transferring a measured angle to the workpiece. If one needs to measure an angle between two physical objects (e.g. two adjoining walls), one will place the Sliding T-Bevel along the sides of the angle (e.g. adjoining walls in a corner), making sure the sides of the Sliding T-Bevel are aligned to the sides of the corner. Subsequent tightening of the thumb nut will allow the Sliding T-Bevel to retain the transferred angle even after removal from the corner.

Figure 2:
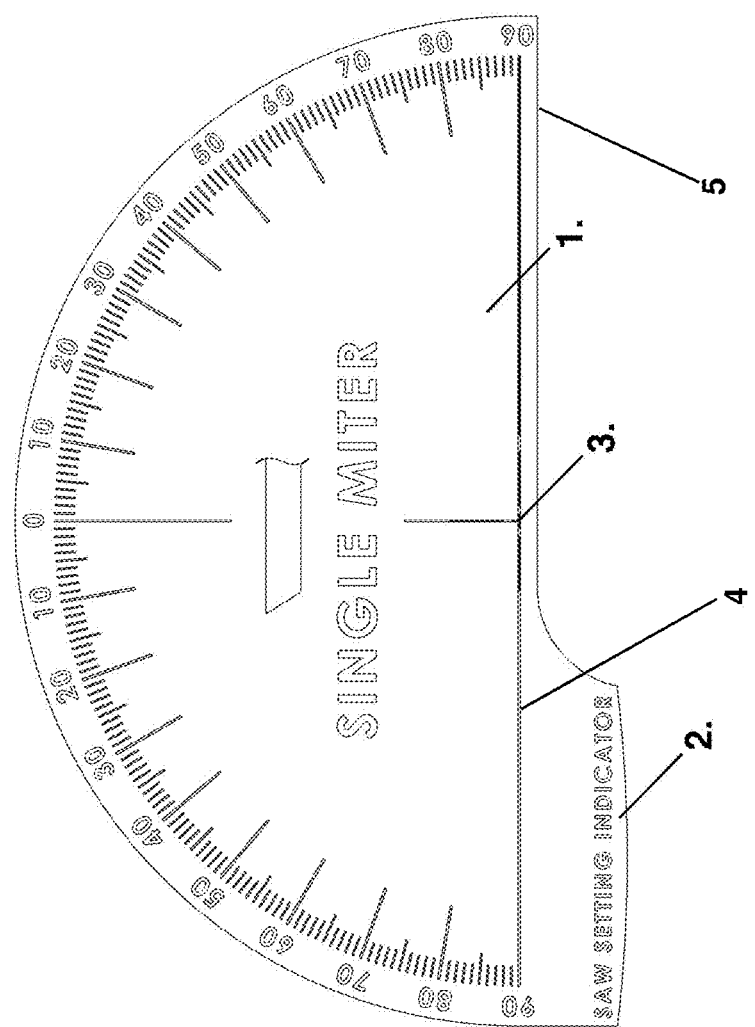
FIG. 2 is a front view of a protractor according to this invention.

FIG. 2 is a front view of a protractor according to this invention. On this face, the protractor has the miter saw angle settings for single miter cuts. The protractor consists of the half circle disc 1, with angle scale measurements scribed thereon, with the 0 (zero) setting at the topmost vertical position and with settings of 90 (ninety) at both extreme left and right horizontal ends; a horizontal line 4 runs between these two horizontal ends. The bottom edge 5 of the protractor is parallel with the horizontal line 4.

A tab 2 is extending down from the bottom edge 5 of the protractor, which tab 2 serves to ensure that a Sliding T-Bevel is always placed properly on the face of the protractor so as to read the proper saw setting needed for the desired miter saw cut. The width of the tab 2 is smaller than the width of the bottom edge 5. FIGS. 4a, 4b, 5a and 5b show how a Sliding T-Bevel is placed properly on the face of the protractor to read the proper saw setting for the desired miter cut. As shown in FIGS. 4a, 4b, 5a and 5b, the tab 2 makes it impossible for the Sliding T-Bevel to engage the protractor in the wrong orientation.

Also seen in FIG. 2 is the origin 3, which is the point where the vertical and horizontal axes of the half circle disc intersect. Also seen in FIG. 2 is the inscription "SINGLE MITER" on this face, which tells the user that this is the face of the protractor that must be used to determine the saw setting needed for single miter cuts.

Figure 3:
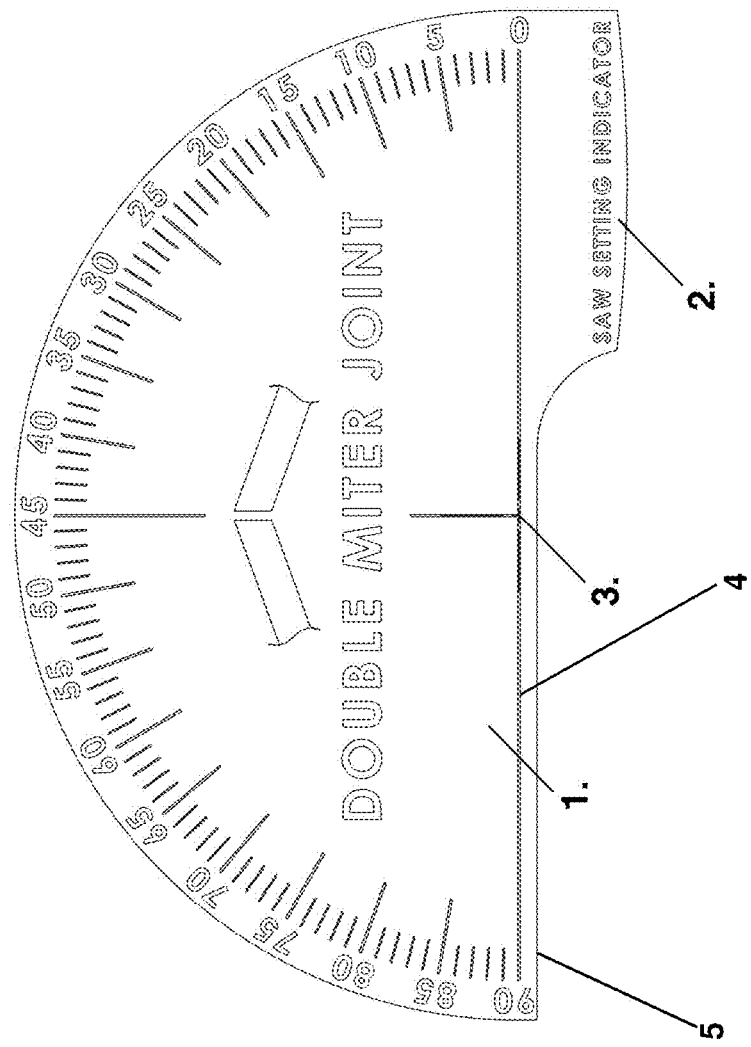
FIG. 3 is a rear view of a protractor according to this invention.

FIG. 3 is a rear view of a protractor according to this invention, which shows the face opposite to the face shown in FIG. 2. On this face, the protractor has the miter saw angle settings for the double miter joint cut. Accordingly, the graduations on this face are different from those shown in FIG. 2, namely a setting of 45 (forty five) at the topmost vertical position, and with a setting of 90 (ninety) at the left horizontal end, and with a setting of 0 (zero) at the right horizontal end.

Figure 6:
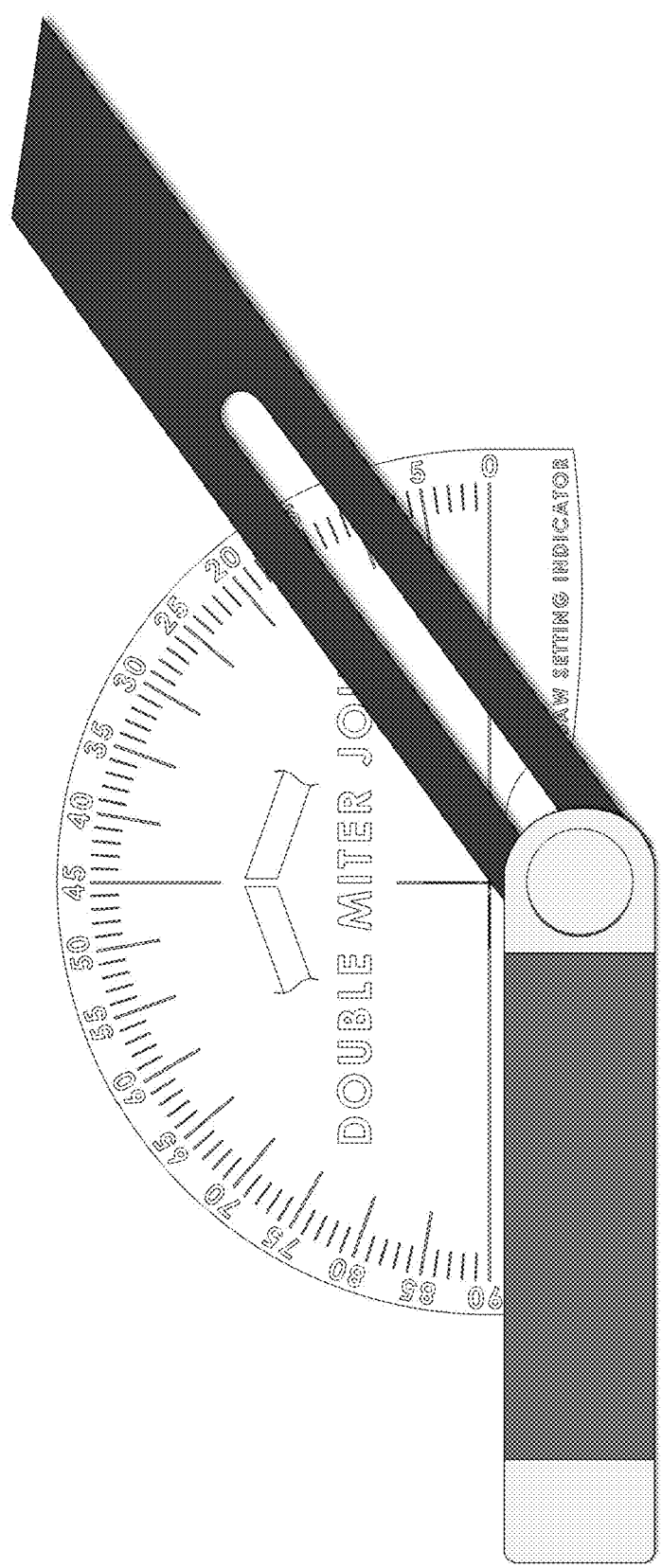
FIG. 6 is a rear view of a protractor according to this invention, depicted in functional engagement with the Sliding T-Bevel, whereby the user can directly read the required miter saw setting for the double miter joint cut (in the specific example in FIG. 6, this setting is 18°).
Figure 7:
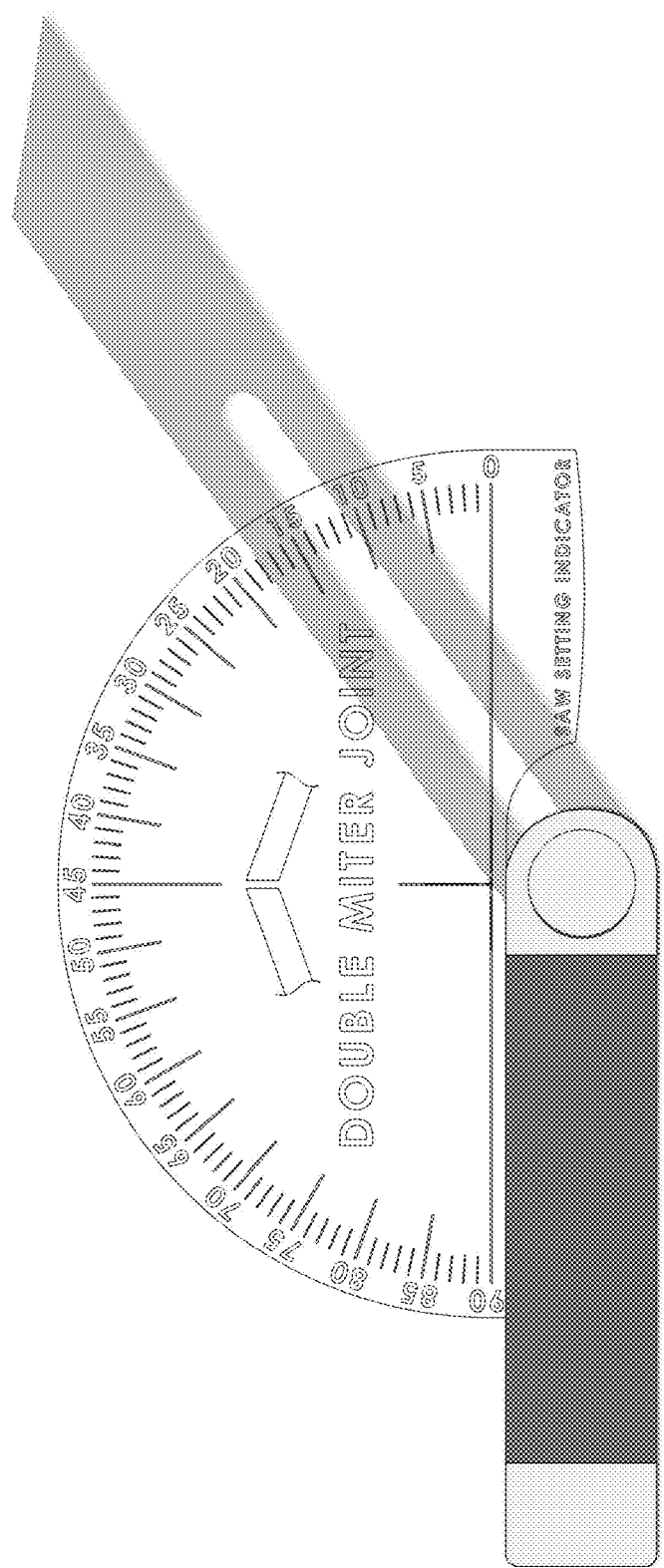
FIG. 7 is a rear view of a protractor according to this invention; it is the same as FIG. 6 above, but with the blade of the Sliding T-Bevel depicted semi-transparently, so as to better show the portions of the protractor underneath the blade of the Sliding T-Bevel.

As seen in FIG. 3, the tab 2 is extending down from the bottom edge 5 of the protractor (on the opposite side compared to FIG. 2, as a result of the protractor being flipped over). As shown in FIG. 6 and FIG. 7, the tab 2 makes it impossible for the Sliding T-Bevel to engage the protractor in the wrong orientation.

Also seen in FIG. 3 is the inscription "DOUBLE MITER JOINT" on this face, which tells the user that this is the face of the protractor that must be used to determine the saw setting needed for double miter joint cuts.

Figure 8:
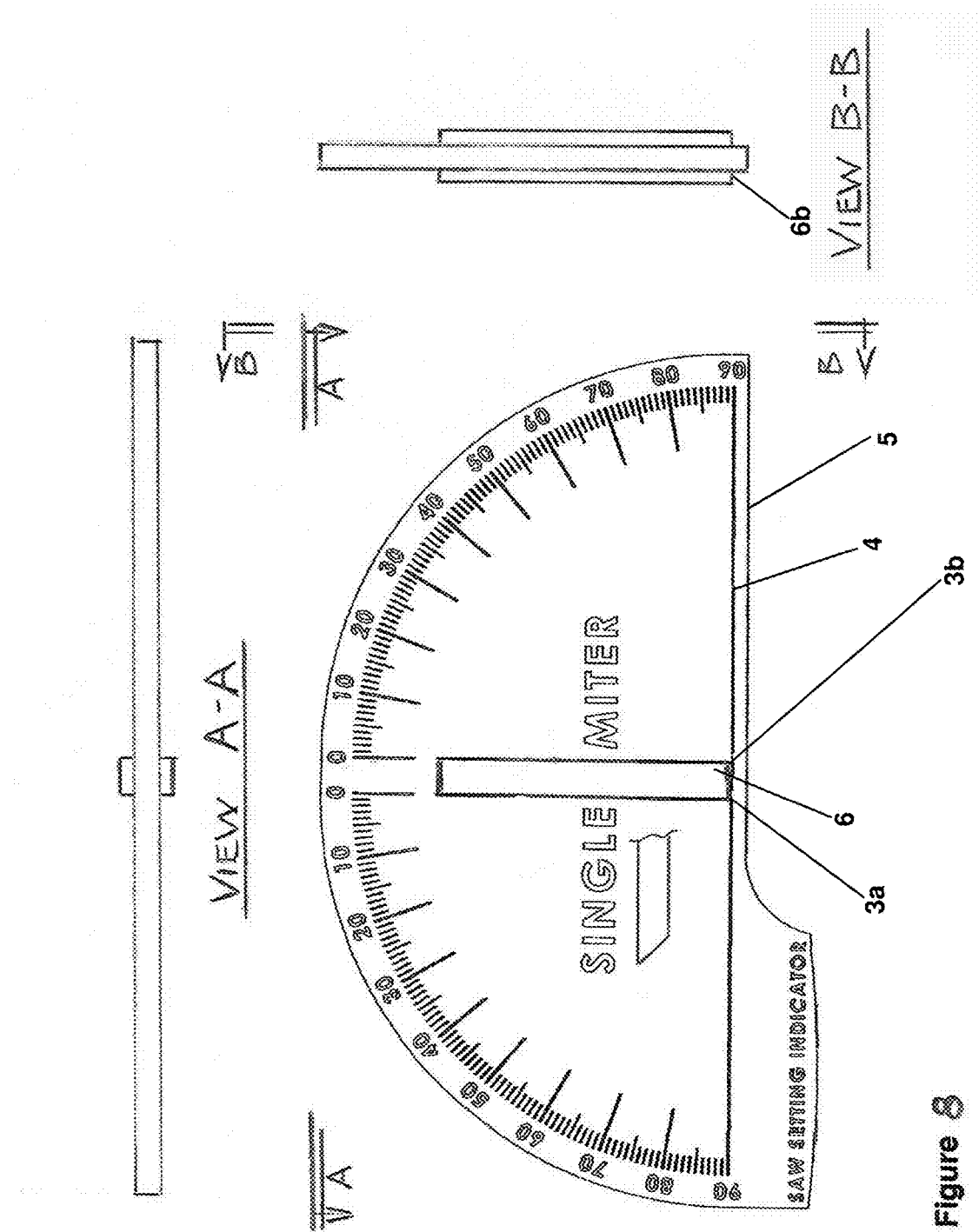
FIG. 8 is a composite front, top and side view of a protractor according to an alternative embodiment of this invention, with a raised member positioned on each face, along the central vertical axis of the protractor.
Figure 9:
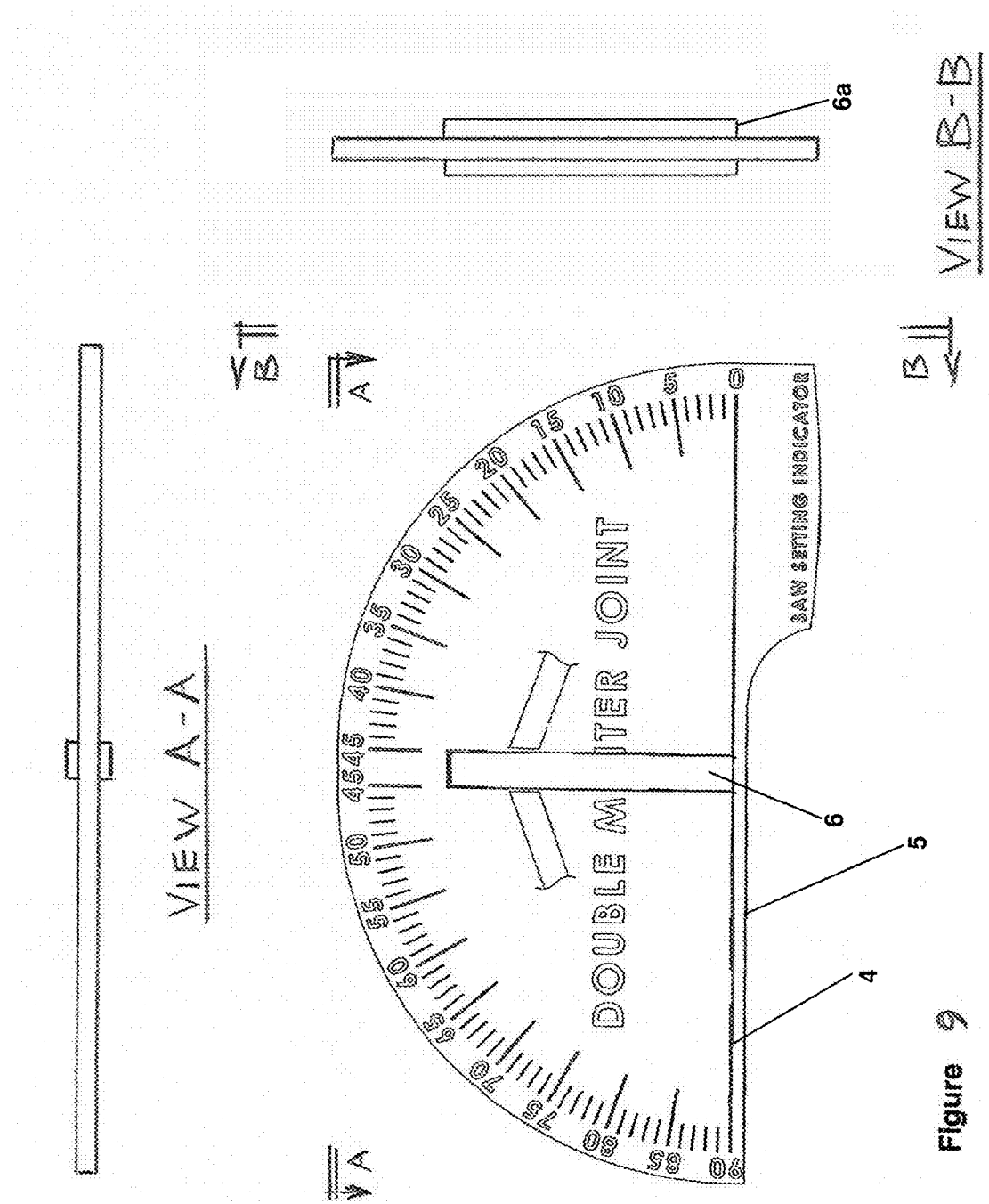
FIG. 9 is a composite front, top and side view of the obverse face of the same embodiment from FIG. 8 above.
Figure 11:
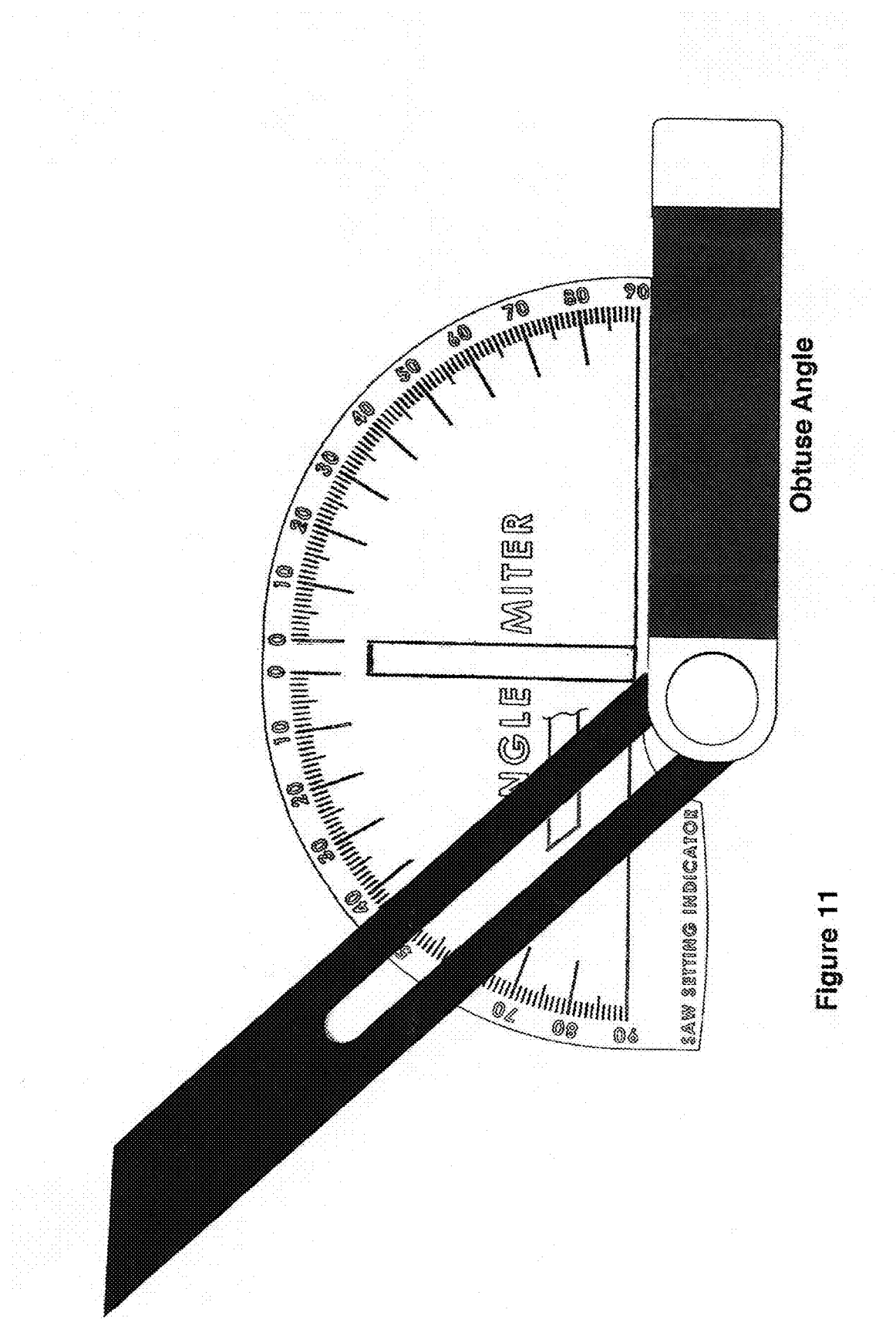
FIG. 11 is a front view of the same embodiment from FIG. 8 above, depicted in functional engagement with a Sliding T-Bevel which has picked up an "obtuse angle", whereby the user can directly read the required miter saw setting for the single miter cut (in the specific example in FIG. 11, this setting is 43°).
Figure 12:
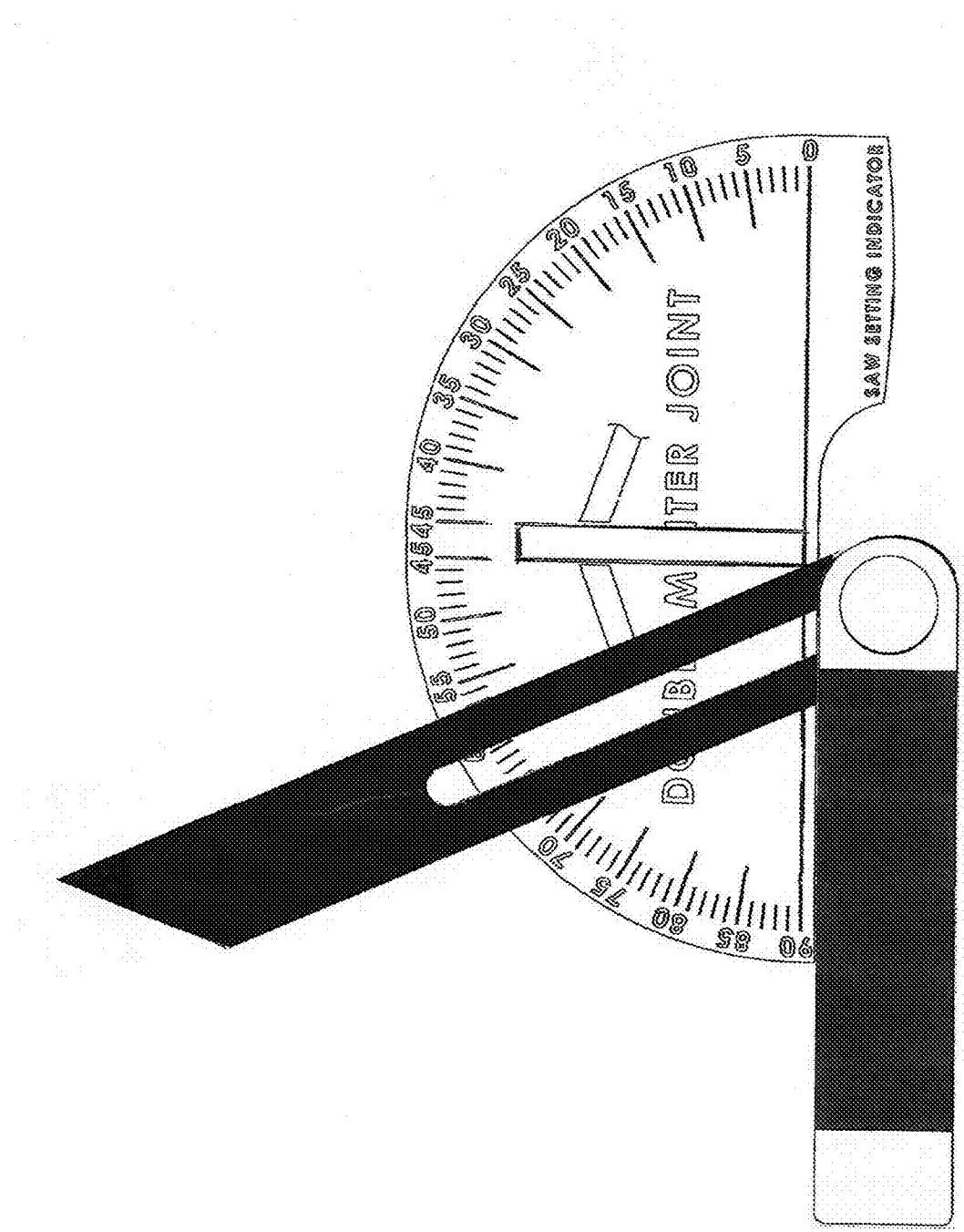
FIG. 12 is a front view of the same embodiment from FIG. 8 above, depicted in functional engagement with a Sliding T-Bevel which has picked up an "acute angle", whereby the user can directly read the required miter saw setting for the double miter cut (in the specific example in FIG. 12, this setting is 57°).
Figure 13:
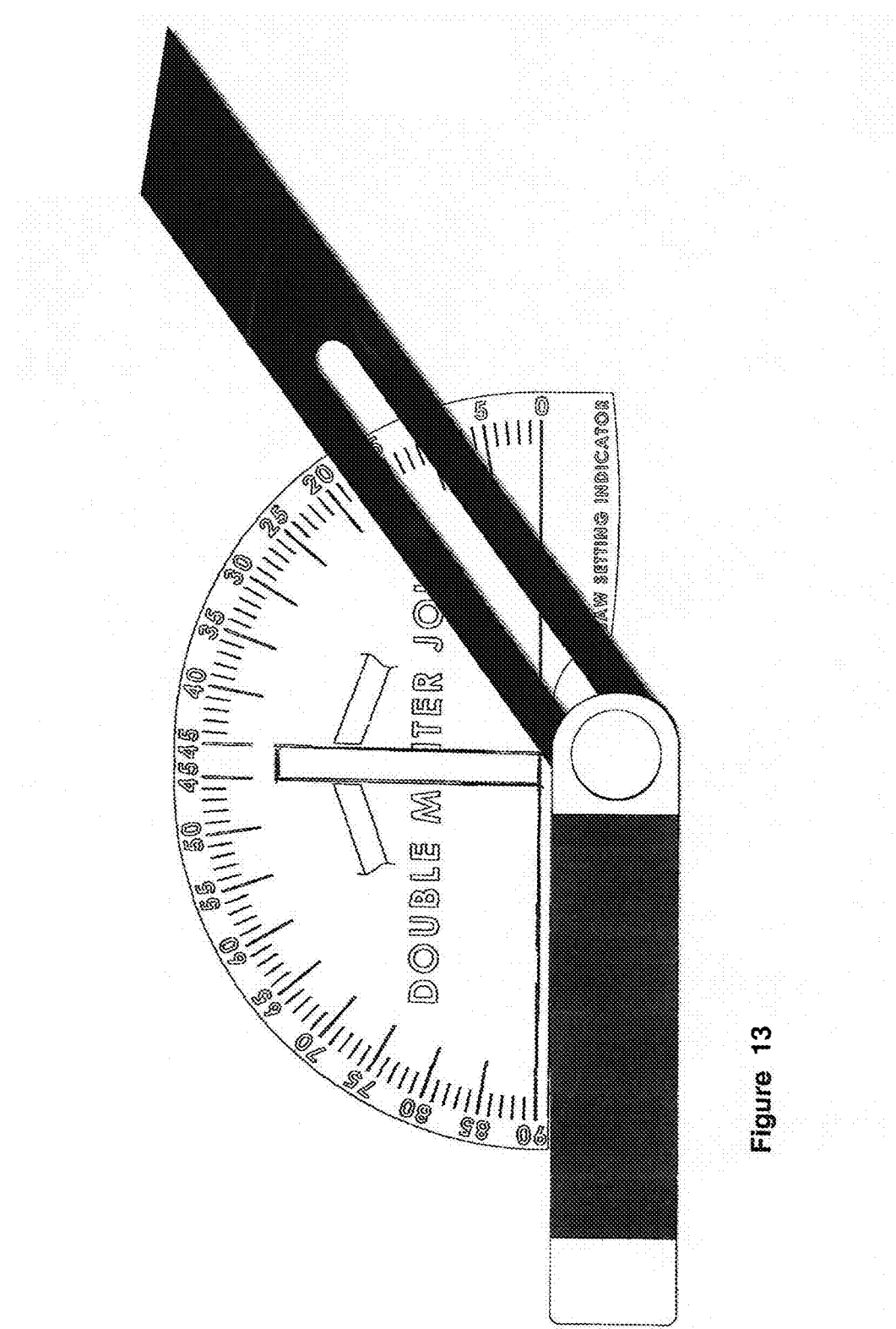
FIG. 13 is a front view of the same embodiment from FIG. 8 above, depicted in functional engagement with a Sliding T-Bevel which has picked up an "obtuse angle", whereby the user can directly read the required miter saw setting for the double miter cut (in the specific example in FIG. 13, this setting is 18°).
Figure 14:
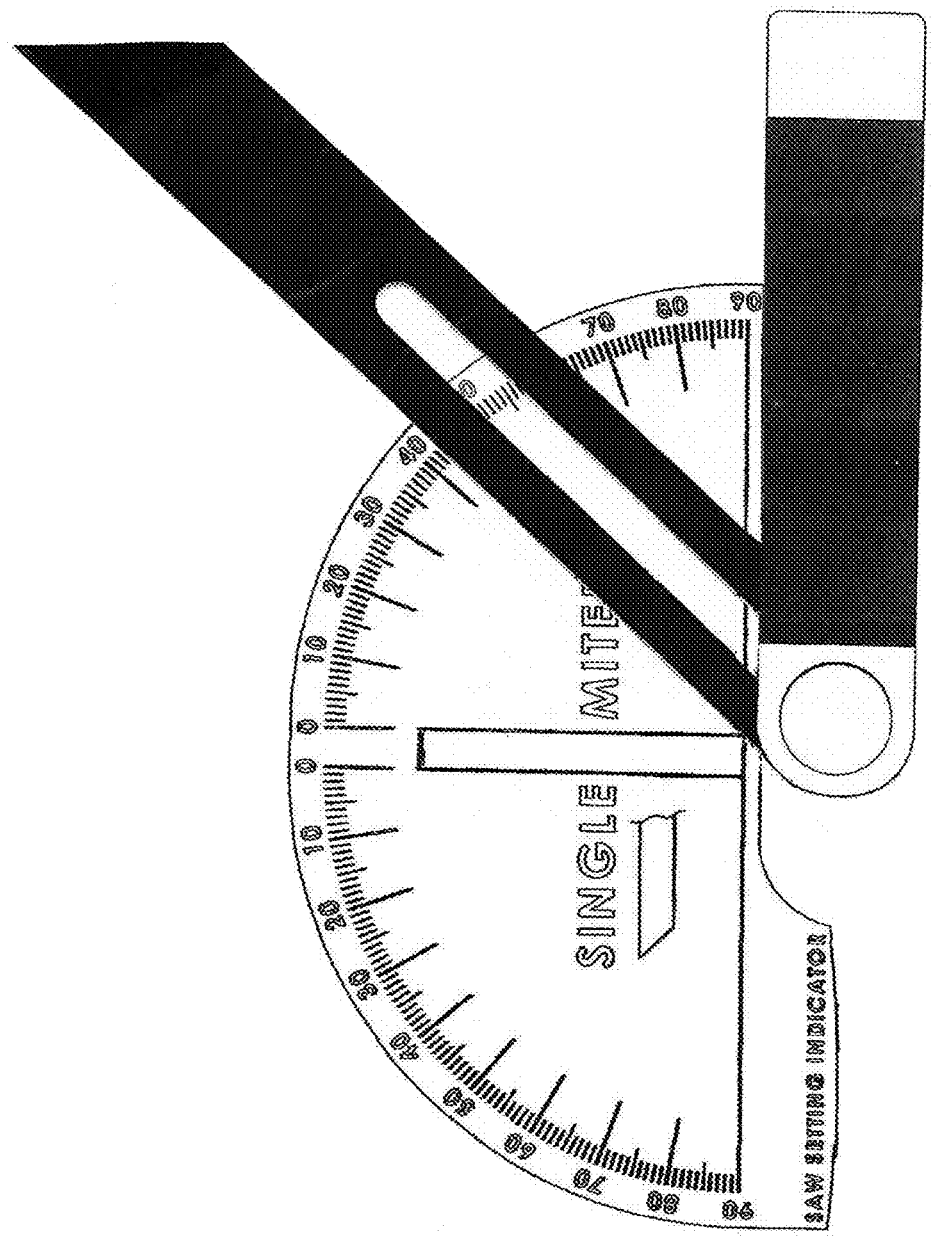
FIG. 14 is a front view of the same embodiment from FIG. 8 above, depicted in functional engagement with a Sliding T-Bevel which has picked up an "acute angle", whereby the user can directly read the required miter saw setting for the single miter cut (in the specific example in FIG. 14, this setting is 43°).

As seen in FIGS. 8 and 9, an alternative embodiment of this invention has the two quarter-circle dial portions of the protractor (of the overall half-circle disk) transposed sideways slightly apart; as a result of this transposition, there are now two origins, namely 3a and 3b, with origin 3a corresponding to the left quarter-circle portion and origin 3b corresponding to the right quarter-circle portion. In the gap between the origins 3a and 3b, on both faces of the protractor, a raised member 6 is rigidly positioned along the central vertical axis of the protractor, one such raised member 6 on each face of the protractor.

The raised member 6 does not extend below the horizontal line 4 on the protractor. The raised member 6 intersects with the horizontal line 4 at two points which correspond exactly with the two origins 3a and 3b. As a result of this positioning, the raised member 6 offers (for possible abutting engagement) two raised edges 6a and 6b, oriented perpendicularly to the plane of the protractor and corresponding exactly with the two origins 3a and 3b. The functional result of such structure is that any other straight edge, if laid onto the protractor, parallel to the plane of the protractor and abutting against one of the raised edges 6a or 6b, will be perfectly and automatically aligned with the origins 3a or 3b, reducing the need for an user to manually effect such alignment.

For an accurate angle reading according to this embodiment, the user simply positions the handle of the T-Bevel abutting (and flush with) the bottom edge 5 of the protractor, while bringing either edge of the blade of the T-Bevel to rest against the raised edges 6a or 6b of the raised member 6; the proper saw setting can then be read where the same edge of the blade of the T-Bevel intersects the angle-graduated dial.

As seen in FIG. 10, a further alternative embodiment of this invention is similar to the embodiment shown in FIGS. 2-7, with the modification that the bottom edge 5 of the protractor is aligned and flush with the horizontal line 4. By contrast, in the embodiment shown in FIGS. 2-7, the bottom edge 5 of the protractor is parallel with the horizontal line 4, but slightly offset from the horizontal line 4.

METHOD OF USE

To use this invention, a handyman would need first to determine what kind of miter cut is needed (double miter joint cut, or single miter cut) and then choose the appropriate face of the protractor from which to make the reading (either the face shown in FIG. 2 or the face shown in FIG. 3).

For a double miter joint cut, the user needs then to measure the angle at the corner between the two adjoining walls, by placing the Sliding T-Bevel along the adjoining walls in the corner, making sure the sides of the Sliding T-Bevel are aligned to the sides of the corner. Subsequent tightening of the thumb nut will allow the Sliding T-Bevel to retain the transferred angle even after removal from the corner.

For a single miter cut, the user sets the angle of the Sliding T-Bevel to the existing angle and parallel with the material to be cut.

The next step involves the placement of the Sliding T-Bevel onto the appropriate face of the protractor from which to make the reading (either on the face marked "SINGLE MITER", as shown in FIGS. 4a-4b and FIGS. 5a-5b, or on the face marked "DOUBLE MITER JOINT", as shown in FIG. 6 and FIG. 7). For a proper angle setting reading on both faces, care must be taken to ensure that the edge of the blade of the Sliding T-Bevel must pass through (must be aligned with) the origin 3 marked on the center of the protractor. The handle of the Sliding T-Bevel must be in abutting parallel alignment with the bottom edge of the protractor. The user can then read directly the miter saw angle setting on the semicircular graduated scale.

In the example illustrated in FIGS. 4*a*, 4*b*, 5*a* and 5*b*, the user reads a setting of 43° for a single miter cut. The user will then adjust the angle of his power miter saw blade to point to a setting of 43° on the miter saw angle gauge (normally indexed around the edge of the miter saw table), and will proceed to make the cut.

In the example illustrated in FIG. 6 and FIG. 7, the user reads a setting of 18° for a double miter joint cut. The user will then adjust the angle of his power miter saw blade to point to a setting of 18° on the miter saw angle gauge (normally indexed around the edge of the miter saw table), and will proceed to cut each of the two pieces that will form the miter joint.

To use the embodiment of the invention depicted in FIGS. 8-9, the user simply positions the handle of the T-Bevel abutting (and flush with) the bottom edge 5 of the protractor, while bringing either edge of the blade of the T-Bevel to rest against the raised edge 6*a* or 6*b* of the raised member 6; the proper saw setting can then be read where the same edge of the blade of the T-Bevel intersects the angle-graduated dial. The role of the raised member 6 is to ensure that the edge of the blade of the T-Bevel always passes through (is aligned with) the origins 3*a* or 3*b*; this is accomplished automatically and in a foolproof manner whenever an edge of the blade of the T-Bevel is brought to bear against the raised edges 6*a* or 6*b* of the raised member 6.

The embodiment of the invention depicted in FIG. 10 is used in the same manner as the embodiments depicted in FIGS. 2-7, as described above.

As to their construction, the embodiments of this invention, as shown in FIGS. 2-10 and discussed above, may be made of any suitable material of sufficient rigidity, strength and thickness, such as steel, stainless steel, aluminum, other metals and alloys, plastic, etc. Various sizes of protractors according to this invention can be manufactured, so as to be able to work with common sizes of Sliding T-Bevels. The raised dimension of the raised member 6 should be of any thickness sufficient to permit stable engagement between the blade of a T-bevel and the raised edges 6*a* or 6*b* of the raised member 6. The raised member 6 may be made unitary with the protractor, or may be manufactured separately and fitted to the protractor by any known permanent or temporary attaching means.

The present invention also includes any possible additional variants of the embodiment depicted in FIGS. 8-9, which may employ, aside from the raised member 6 described above, other known structural solutions to achieve the functionality of "centering means" for the engagement between a T-Bevel and the protractor according to this invention. Possible examples of such alternative "centering means" are (not an exhaustive list): i) a raised feature (pin) on the T-Bevel blade may slidingly engage (mate with) a depressed feature (hole) in the protractor (or vice-versa), positioned to effect alignment with origins 3, or 3*a*, or 3*b*; ii) the raised member 6 may be reduced to one pin (or several pins) positioned to act as "centering means" on the origins 3, or 3*a*, or 3*b*; iii) the raised member 6 may be reduced to one narrow raised "thin blade", effectively offering for engagement just one raised edge corresponding to origin 3.

The advantages of various embodiments of the present invention include, without limitation, being inexpensive to manufacture, easy to use, being able to work with Sliding T-Bevels (and with other tools of the same functionality as Sliding T-Bevels) and being able to directly provide the proper saw setting needed for the desired miter saw cut.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method and examples, but by all embodiments and methods within the scope and spirit of the invention.

I claim:

1. A protractor for assistance in determining miter saw angle settings for miter cuts, said protractor comprising:
   a top edge;
   at least one face with angle markings;
   a bottom edge; and
   a tab adjacent to the bottom edge and extending lower than said bottom edge, wherein the at least one face further comprises a horizontal line, disposed near or on the bottom edge and parallel to the bottom edge, at least one vertical axis, disposed perpendicularly on the horizontal line, at least one origin defined as a point where the horizontal line intersects with the at least one vertical axis, at least one raised member having at least one raised edge, and the at least one raised edge is perpendicular to the at least one face and intersects said at least one face at a point which is the at least one origin.

2. The protractor of claim 1, wherein the at least one face further comprises markings, pictograms and indicia for proper identification, positioning and use of the protractor in conjunction with a Sliding T-Bevel.

3. The protractor of claim 1, wherein the at least one face comprises one obverse face and one reverse face.

4. The protractor of claim 3, wherein the obverse face has angle markings adapted to read miter saw angle settings for single miter cuts, and the reverse face has angle markings adapted to read miter saw angle settings for double miter joints.

5. A method for using a protractor for determining miter saw angle settings for miter cuts, the protractor comprising:
   a top edge;
   at least one face with angle markings;
   a bottom edge; and
   a tab adjacent to the bottom edge and extending lower than said bottom edge, wherein the at least one face further comprises a horizontal line, disposed near or on the bottom edge and parallel to the bottom edge, at least one vertical axis, disposed perpendicularly on the horizontal line, at least one origin defined as a point where the horizontal line intersects with the at least one vertical axis, at least one raised member having at least one raised edge, and the at least one raised edge is perpendicular to the at least one face and intersects said at least one face at a point which is the at least one origin, said method comprising the steps of:
   Transferring a target angle to a Sliding T-Bevel having a handle edge and a blade edge;
   Positioning said Sliding T-Bevel in a functional engagement with said protractor, wherein the handle edge is in abutting engagement with the bottom edge and the blade edge is aligned with the at least one origin;
   Reading a resultant miter saw angle setting value according to a nearest alignment between the blade edge and the angle markings, wherein said tab prevents the handle of the Sliding T-Bevel from engaging the bottom edge of the protractor in an improper orientation.

6. The method of claim 5 whereby the alignment between the blade edge and the at least one origin is automatically effected when the blade edge is in abutting engagement with the at least one raised edge.

7. A kit comprising:
   a protractor comprising:
      a top edge;
      at least one face with angle markings;
      a bottom edge; and
      a tab adjacent to the bottom edge and extending lower than said bottom edge, wherein the at least one face further comprises a horizontal line, disposed near or on the bottom edge and parallel to the bottom edge, at least one vertical axis, disposed perpendicularly on the horizontal line, at least one origin defined as a point where the horizontal line intersects with the at least one vertical axis, at least one raised member having at least one raised edge, and the at least one raised edge is perpendicular to the at least one face and intersects said at least one face at a point which is the at least one origin; and
   a customized Sliding T-Bevel having a handle edge and a blade, wherein said protractor is further fitted with protractor centering means; said customized Sliding T-Bevel is further fitted with T-bevel centering means; said protractor centering means are adapted to effect a reversible interlocking engagement with said bevel centering means; whereby said interlocking engagement automatically aligns the blade with the at least one origin; and wherein said protractor centering means and T-bevel centering means are selected from the group consisting of pin and hole; matching interlocking members; magnetic centering means; key and hole centering means; hook and loop centering means; socket and ball centering means; and snap centering means.

8. A method for using the kit of claim 7 for determining miter saw angle settings for miter cuts, said method comprising the steps of: Transferring a target angle to the customized Sliding T-Bevel; Positioning said Sliding T-Bevel in a functional engagement with said protractor, whereby the handle edge is in abutting engagement with the bottom edge and the protractor centering means are in a reversible interlocking engagement with said bevel centering means; Reading a resultant miter saw angle setting value according to a nearest alignment between the blade and the angle markings.

* * * * *